US012652070B2

(12) United States Patent
Kim

(10) Patent No.: US 12,652,070 B2
(45) Date of Patent: Jun. 9, 2026

(54) RECEIVER CIRCUIT

(71) Applicant: SK hynix Inc., Icheon-si (KR)

(72) Inventor: Bo Ram Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 311 days.

(21) Appl. No.: 18/441,378

(22) Filed: Feb. 14, 2024

(65) Prior Publication Data

US 2025/0119170 A1 Apr. 10, 2025

(30) Foreign Application Priority Data

Oct. 4, 2023 (KR) ........................ 10-2023-0131702

(51) Int. Cl.
 *H04B 1/16* (2006.01)
 *H04B 1/18* (2006.01)
(52) U.S. Cl.
 CPC ............. *H04B 1/1607* (2013.01); *H04B 1/18* (2013.01)
(58) Field of Classification Search
 CPC .......... H04B 1/06; H04B 1/16; H04B 1/1607; H04B 1/18; H04B 1/38; H04B 1/40; H04B 1/401; H04B 1/44; H04L 25/03878; H04L 25/40; H04L 25/49; H04L 25/4917; G06F 13/38; G06F 13/40
See application file for complete search history.

(56) References Cited

U.S. PATENT DOCUMENTS

| | | | |
|---|---|---|---|
| 9,537,681 B1* | 1/2017 | Chan ................. | H04L 25/03012 |
| 10,447,512 B2* | 10/2019 | Lin ..................... | H04L 25/4917 |
| 10,623,217 B1* | 4/2020 | Turner .............. | H04L 25/03878 |
| 11,881,281 B2* | 1/2024 | Zhang ................. | G11C 7/1093 |
| 2020/0265882 A1 | 8/2020 | Ataul | |
| 2022/0360476 A1 | 11/2022 | Palusa et al. | |

FOREIGN PATENT DOCUMENTS

KR 1020220099251 A 7/2022

* cited by examiner

*Primary Examiner* — Quochien B Vuong
(74) *Attorney, Agent, or Firm* — WILLIAM PARK AND ASSOCIATES LTD.

(57) ABSTRACT

A receiver circuit includes a first buffer, a second buffer, and a sampling circuit. The first buffer receives a multi-level signal according to a first reference voltage to generate a first input signal. The second buffer receives the multi-level signal according to a second reference voltage to generate a second input signal. The sampling circuit samples each of the first input signal and the second input signal according to a first equalization method and a second equalization method, respectively, and outputs at least one of a first sampling result value according to the first equalization method and a second sampling result value according to the second equalization method according to a logic value of a previously input multi-level signal.

29 Claims, 9 Drawing Sheets

201A

202A

FIG. 8
| Dn-1 | | VREF | | | | SEL_M | SEL_L |
| --- | --- | --- | --- | --- | --- | --- | --- |
| MSB | LSB | DFH | LUH (FIXED) | DFL | LUL (FIXED) | | |
| 0 | 0 | VREF_H-1 | VREF_H-3 | VREEF_L-1 | VREEF_L+3 | LUH | DFL |
| 0 | 1 | VREF_H-1 | VREF_H-3 | VREEF_L+1 | VREEF_L+3 | DFH | DFL |
| 1 | 1 | VREF_H+1 | VREF_H-3 | VREEF_L+1 | VREEF_L+3 | DFH | LUL |
FIG. 9A
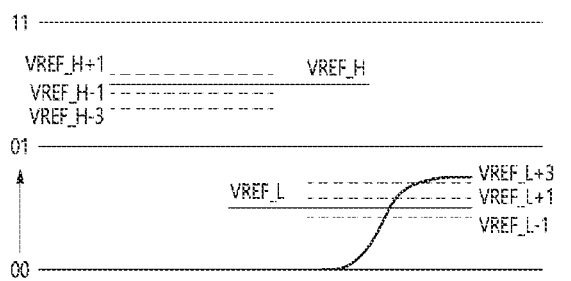
| DFH | LUH (FIXED) | SEL_M |
| --- | --- | --- |
| VREF_H-1 | VREF_H-3 | LUH |
| DFL | LUL (FIXED) | SEL_L |
| VREEF_L-1 | VREEF_L+3 | DFL |
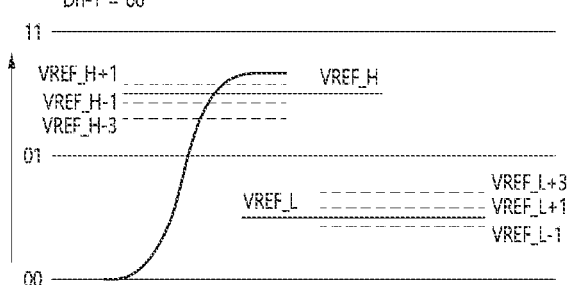
| DFH | LUH (FIXED) | SEL_M |
| --- | --- | --- |
| VREF_H-1 | VREF_H-3 | LUH |
| DFL | LUL (FIXED) | SEL_L |
| VREEF_L-1 | VREEF_L+3 | DFL |

Dn-1 = 01

| DFH | LUH (FIXED) | SEL_M |
|---|---|---|
| VREF_H-1 | VREF_H-3 | DFH |
| DFL | LUL (FIXED) | SEL_L |
| VREEF_L+1 | VREEF_L+3 | DFL |

Dn-1 = 01

| DFH | LUH (FIXED) | SEL_M |
|---|---|---|
| VREF_H-1 | VREF_H-3 | DFH |
| DFL | LUL (FIXED) | SEL_L |
| VREEF_L+1 | VREEF_L+3 | DFL |

Dn-1 = 11

| DFH | LUH (FIXED) | SEL_M |
|---|---|---|
| VREF_H+1 | VREF_H-3 | DFH |
| DFL | LUL (FIXED) | SEL_L |
| VREEF_L+1 | VREEF_L+3 | LUL |

Dn-1 = 11

| DFH | LUH (FIXED) | SEL_M |
|---|---|---|
| VREF_H+1 | VREF_H-3 | DFH |
| DFL | LUL (FIXED) | SEL_L |
| VREEF_L+1 | VREEF_L+3 | LUL |

RECEIVER CIRCUIT

CROSS-REFERENCES TO RELATED APPLICATION

The present application claims priority under 35 U.S.C. § 119(a) to Korean application number 10-2023-0131702 filed on Oct. 4, 2023, in the Korean Intellectual Property Office, which is incorporated herein by reference in its entirety as set forth in full.

BACKGROUND

1. Technical Field

Various embodiments generally relate to a semiconductor circuit, and, more particularly, to a receiver circuit having an equalization function.

2. Related Art

An electronic device includes many electronic elements and a computer system. The electronic device includes many semiconductor apparatuses each configured by a semiconductor. The semiconductor apparatuses configuring the computer system may perform data communication in synchronization with a clock signal. The semiconductor apparatuses may be connected to other semiconductor apparatuses via a signal bus, such as a data bus, and may transmit signals having information corresponding to data via the signal bus. The semiconductor apparatuses may be equipped with a signal transmission circuit for transmitting the signal via the signal bus, and the signal transmission circuit may transmit the signal by transmitting an analog voltage via the signal bus. Generally, the signal transmission circuit may transmit an analog voltage corresponding to a high logic level and an analog voltage corresponding to a low logic level. However, in order to transmit more information in a single signal transmission, a multi-level signal transmission method using Pulse Amplitude Modulation (PAM) is being used. The multi-level signal transmission method can transmit more than two bits of digital information as one analog signal by subdividing the level of the analog voltage transmitted through the signal bus.

In general, equalization functions are applied in PAM-based multi-level signal systems. Direct feedback and loop unrolled methods are used for equalization functions, but the direct feedback method has the problem of securing feedback time, and the loop unrolled method has the problem of increased circuit area and increased power consumption.

SUMMARY

In an embodiment, a receiver circuit may include a first buffer, a second buffer, and a sampling circuit. The first buffer may be configured to receive a multi-level signal according to a first reference voltage to generate a first input signal. The second buffer may be configured to receive the multi-level signal according to a second reference voltage to generate a second input signal. The sampling circuit may be configured to sample each of the first input signal and the second input signal according to a first equalization method and a second equalization method, respectively, and may be configured to output one of a first sampling result value according to the first equalization method and a second sampling result value according to the second equalization method according to a logic value of a previously input multi-level signal.

In an embodiment, a receiver circuit may include a first buffer, a second buffer, a first sampling circuit, and a second sampling circuit. The first buffer may be configured to receive a multi-level signal according to a first reference voltage to generate a first input signal. The second buffer may be configured to receive the multi-level signal according to a second reference voltage to generate a second input signal. The first sampling circuit may be configured to sample the first input signal using a first equalization method to generate a first preliminary sampling signal, may be configured to sample the first input signal using a second equalization method to generate a second preliminary sampling signal, may be configured to generate a first selection signal based on one of the first preliminary sampling signal and the second preliminary sampling signal, and may be configured to select and output one of the first preliminary sampling signal and the second preliminary sampling signal as a first sampling signal based on a second selection signal. The second sampling circuit may be configured to sample the second input signal using the first equalization method to generate a third preliminary sampling signal, may be configured to sample the second input signal using the second equalization method to generate a fourth preliminary sampling signal, may be configured to generate the second selection signal based on one of the third preliminary sampling signal and the fourth preliminary sampling signal, and may be configured to select and output one of the third preliminary sampling signal and the fourth preliminary sampling signal as a second sampling signal based on the first selection signal.

BRIEF DESCRIPTION OF THE DRAWINGS

FIG. 8 is a diagram illustrating a selection of an equalization method and reference voltage variation of the sampling circuit of FIG. 1 according to an embodiment.

FIG. 9A to FIG. 9C are diagrams illustrating equalization operation of the receiver circuit by logic level transition of a multi-level signal according to an embodiment.

DETAILED DESCRIPTION

Various embodiments can improve the performance of the receiver circuit by minimizing feedback time and reducing power consumption.

Hereinafter, embodiments will be described in more detail with reference to the accompanying drawings.

Figure 1:
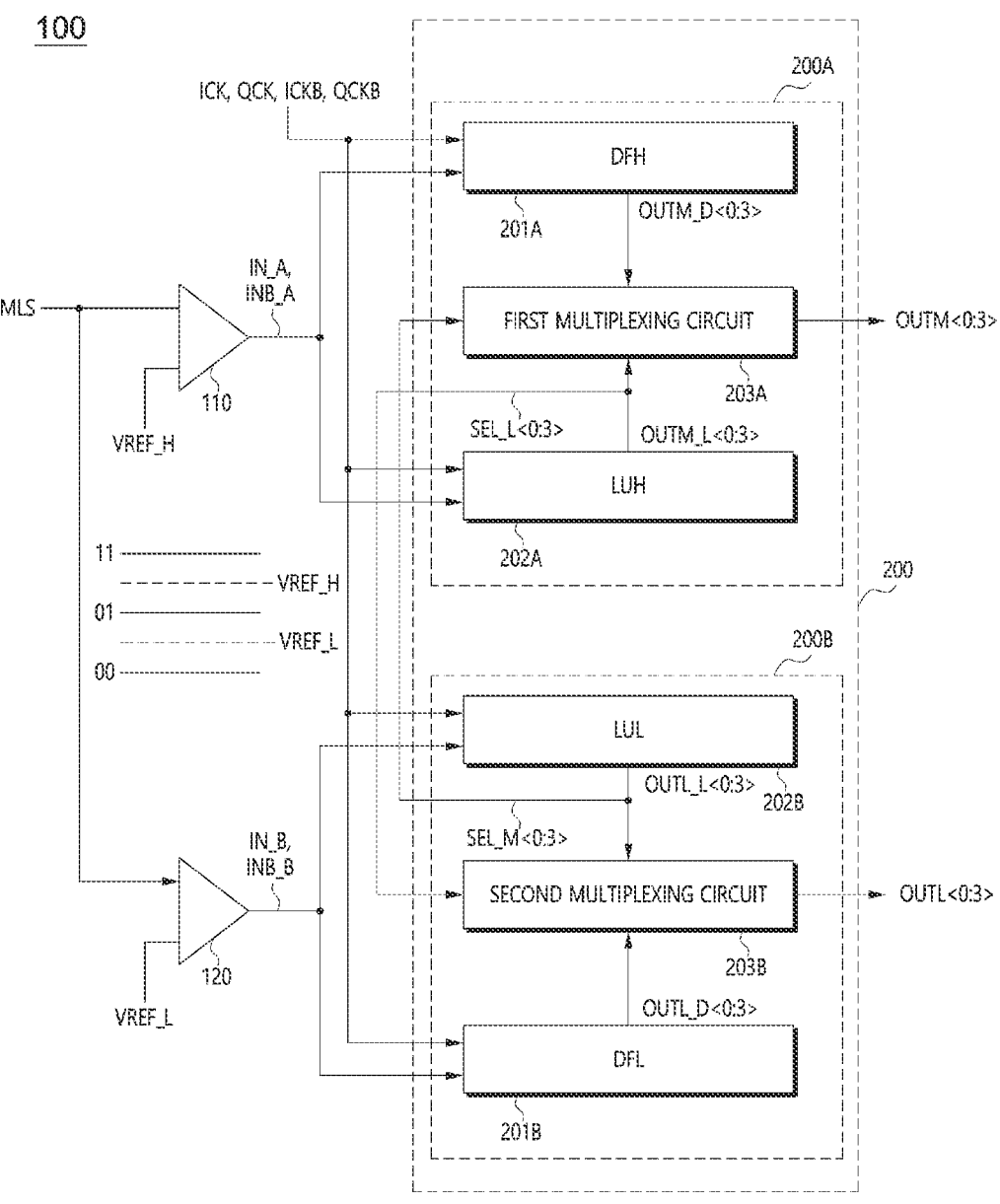
FIG. 1 is a diagram illustrating a configuration of a receiver circuit according to an embodiment.

Referring to FIG. 1, a receiver circuit 100 according to an embodiment may include a first buffer 110, a second buffer 120, and a sampling circuit 200.

The first buffer 110 may receive a multi-level signal MLS according to a first reference voltage VREF_H to generate an input signal in a differential form, that is, first input signals IN_A and INB_A. The multi-level signal MLS may be an analog signal transmitted according to a pulse amplitude modulation (PAM) method. For example, the multi-level signal MLS may be a signal transmitted according to a PAM-3 method. A multi-level signal MLS transmitted according to the PAM-3 method may have voltage levels corresponding to three logic levels: "00", "01", and "11". The first buffer 110 may output the first input signal IN_A at a high level when a voltage level of the multi-level signal MLS is higher than a voltage level of the first reference voltage VREF_H and may output the first input signal IN_A at a low level when the voltage level of the multi-level signal MLS is lower than the voltage level of the first reference voltage VREF_H. Because the first input signals IN_A and INB_A are in differential form, the first input signal INB_A may have a logic level that is opposite to that of the first input signal IN_A. The first input signal IN_A may correspond to a most significant bit (MSB) of the multi-level signal MLS and may be used as a signal for determining the most significant bit (MSB).

The second buffer 120 may receive the multi-level signal MLS according to a second reference voltage VREF_L, which has a lower voltage level compared to the first reference voltage VREF_H, to generate a differential form of the input signal, that is, second input signals IN_B and INB_B. The second buffer 120 may output the second input signal IN_B at a high level among the second input signals IN_B and INB_B when the voltage level of the multi-level signal MLS is higher than a voltage level of the second reference voltage VREF_L and may output the second input signal IN_B at a low level when the voltage level of the multi-level signal MLS is lower than the voltage level of the second reference voltage VREF_L. Because the second input signals IN_B and INB_B are in differential form, the second input signal INB_B may have a logic level that is opposite to that of the second input signal IN_B. The second input signal IN_B may correspond to a least significant bit (LSB) of the multi-level signal MLS and may be used as a signal for determining a least significant bit (LSB).

The sampling circuit 200 may sample each of the first input signals IN_A and INB_A and the second input signals IN_B and INB_B according to the first equalization method and the second equalization method, respectively, and may output at least one of a sampling result value according to the first equalization method and a sampling result value according to the second equalization method according to a logic level of the previously input multi-level signal MLS. The first equalization method may be a Direct Feedback (DF) method, and the second equalization method may be a Loop Unrolled (LU) method. The sampling circuit 200 may include a first sampling circuit 200A and a second sampling circuit 200B.

The first sampling circuit 200A may sample the first input signals IN_A and INB_A using the first equalization method to generate a first preliminary sampling signal OUTM_D<0:3>, sample the first input signals IN_A and INB_A using the second equalization method to generate a second preliminary sampling signal OUTM_L<0:3>, generate a first selection signal SEL_L<0:3> according to the second preliminary sampling signal OUTM_L<0:3>, and select one of the first preliminary sampling signal OUTM_D<0:3> and the second preliminary sampling signal OUTM_L<0:3> according to a second selection signal SEL_M<0:3> to be output as a first sampling signal OUTM<0:3>. The first sampling signal OUTM<i> may correspond to a most significant bit of a final sampled data. On the other hand, while the embodiment according to FIG. 1 is an example of the first sampling circuit 200A using the second preliminary sampling signal OUTM_L<0:3> as the first selection signal SEL_L<0:3>, it is also possible to configure the first preliminary sampling signal OUTM_D<0:3> to be used as the first selection signal SEL_L<0:3>.

The first sampling circuit 200A may include a first sampling unit (DFH) 201A, a second sampling unit (LUH) 202A, and a first multiplexing circuit 203A.

The first sampling unit (DFH) 201A may sample the first input signals IN_A and INB_A according to multi-phase clock signals ICK, QCK, ICKB AND QCKB and may perform equalization according to the first equalization method to generate the first preliminary sampling signal OUTM_D<0:3>. The multi-phase clock signals ICK, QCK, ICKB AND QCKB may have a predetermined phase difference between each other.

The second sampling unit (LUH) 202A may sample the first input signals IN_A and INB_A according to the multi-phase clock signals ICK, QCK, ICKB AND QCKB and may perform equalization according to the second equalization method to generate the second preliminary sampling signal OUTM_L<0:3>.

The first multiplexing circuit 203A may select one of the first preliminary sampling signal OUTM_D<0:3> and the second preliminary sampling signal OUTM_L<0:3> according to the second selection signal SEL_M<0:3> and may output the selected signal as the first sampling signal OUTM<0:3>.

The second sampling circuit 200B may sample the second input signals IN_B and INB_B using the first equalization method to generate a third preliminary sampling signal OUTL_D<0:3>, sample the second input signals IN_B and INB_B using the second equalization method to generate a fourth preliminary sampling signal OUTL_L<0:3>, generate a second selection signal SEL_M<0:3> according to the fourth preliminary sampling signal OUTL_L<0:3>, and select one of the third preliminary sampling signal OUTL_D<0:3> and the fourth preliminary sampling signal OUTL_L<0:3> according to the first selection signal SEL_L<0:3> to be output as a second sampling signal OUTL<0:3>. The second sampling signal OUTL<i> may correspond to a least significant bit of a final sampled data. On the other hand, the embodiment according to FIG. 1 is only an example of the second sampling circuit 200B using the fourth preliminary sampling signal OUTL_L<0:3> as the second selection signal SEL_M<0:3>, but it is also possible to configure it to use the third preliminary sampling signal OUTL_D<0:3> as the second selection signal SEL_M<0:3>.

The second sampling circuit 200B may include a third sampling unit (DFL) 201B, a fourth sampling unit (LUL) 202B, and a second multiplexing circuit 203B.

The third sampling unit (DFL) 201B may sample the second input signals IN_B and INB_B according to the multi-phase clock signals ICK, QCK, ICKB AND QCKB and may perform equalization according to the first equalization method to generate the third preliminary sampling signal OUTL_D<0:3>.

The fourth sampling unit (LUL) 202B may sample the second input signal IN_B and INB_B according to the multi-phase clock signals ICK, QCK, ICKB AND QCKB and may perform equalization according to the second equalization method to generate the fourth preliminary sampling signal OUTL_L<0:3>.

The second multiplexing circuit 203B may select one of the third preliminary sampling signal OUTL_D<0:3> and the fourth preliminary sampling signal OUTL_L<0:3> according to the first selection signal SEL_L<0:3> and may output the selected signal as the second sampling signal OUTL<0:3>.

Figure 2:
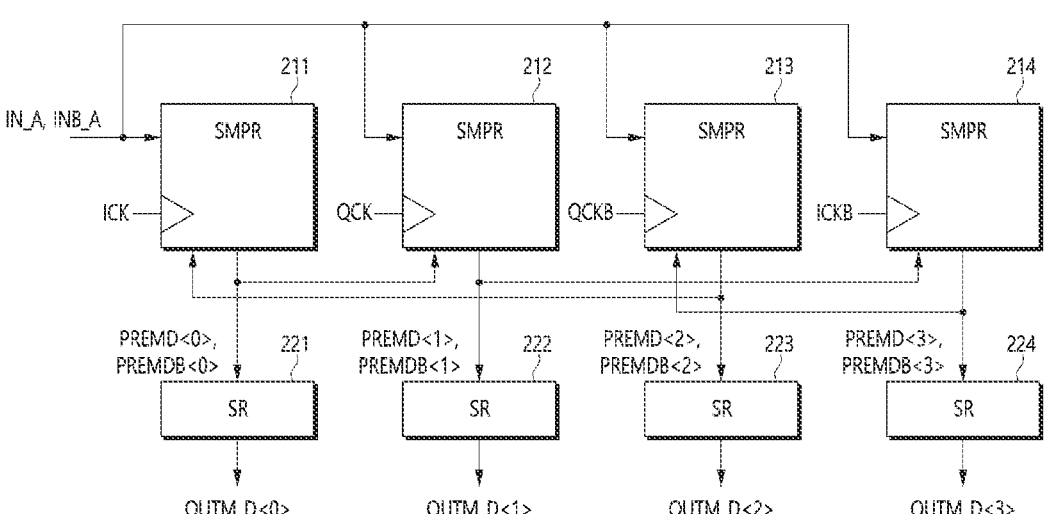
FIG. 2 is a diagram illustrating a configuration of a first sampling unit of FIG. 1 according to an embodiment.

FIG. 2 is a diagram illustrating a configuration of the first sampling unit 201A of FIG. 1 according to an embodiment.

Referring to FIG. 2, the first sampling unit 201A may include a plurality of samplers (SMPRs) 211-214 and a plurality of latches (SRs) 221-224. FIG. 2 illustrates, but is not limited to, an example configuration of four samplers and four latches for a four-phase, multi-phase clock signals ICK, QCK, ICKB AND QCKB.

The plurality of samplers 211-214 may have the same circuit configuration as each other. Each of the plurality of samplers 211-214 may sample the first input signals IN_A and INB_A according to each of the multi-phase clock signals ICK, QCK, ICKB AND QCKB and may perform an equalization operation according to a first equalization method according to a previous data, the previous data being an output of a sampler that receives a clock signal with a phase that precedes that of the received clock signal, among the multi-phase clock signals ICK, QCK, ICKB AND QCKB. Specifically, the plurality of samplers 211-214 may output preliminary signals PREMD<0:3>/PREMDB<0:3> according to the sampling results. For example, the first sampler 211 may perform an equalization operation according to the first equalization method based on an output PREMD<2>/PREMDB<2> of the third sampler 213, which receives the clock signal QCKB with a phase that precedes that of the received clock signal ICK. The second sampler 212 may perform an equalization operation according to the first equalization method based on an output PREMD<0>/PREMDB<0> of the first sampler 211, which receives the clock signal ICK with a phase that precedes that of the received clock signal QCK. The third sampler 213 may perform an equalization operation according to the first equalization method based on an output PREMD<3>/PREMDB<3> of the fourth sampler 214, which receives a clock signal ICKB with a phase that precedes that of the received clock signal QCKB. The fourth sampler 214 may perform an equalization operation according to the first equalization method based on an output PREMD<1>/PREMDB<1> of the second sampler 212, which receives a clock signal QCK with a phase that precedes that of the received clock signal ICKB.

The plurality of latches 221-224 may have the same circuit configuration as each other. The plurality of latches 221-224 may latch the preliminary signals PREMD<0:3>/PREMDB<0:3> and may output the latched signal as the first preliminary sampling signal OUTM_D<0:3>.

Figure 3:
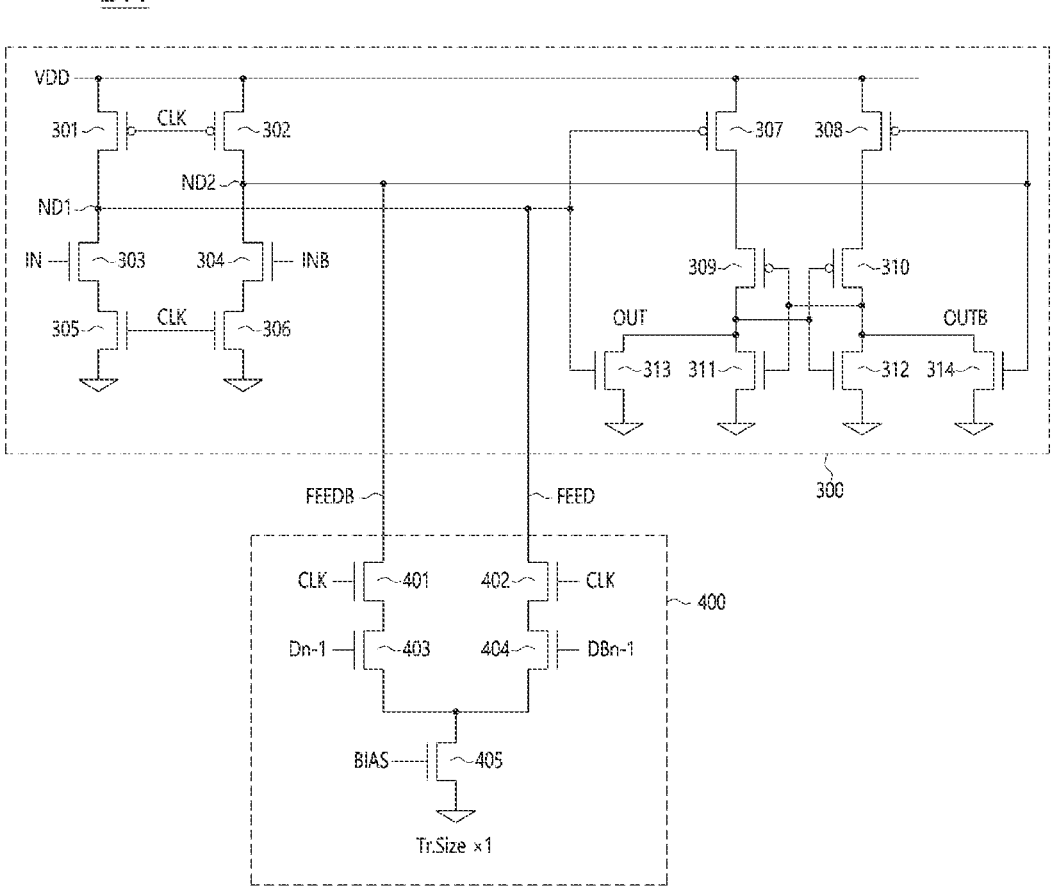
FIG. 3 is a diagram illustrating a configuration of a sampler of FIG. 2 according to an embodiment.

FIG. 3 is a diagram illustrating a configuration of the sampler 211 of FIG. 2 according to an embodiment.

Referring to FIG. 3, the sampler 211 may include a sampling circuit 300 and an equalization circuit 400.

Sampling circuit 300 may have a double-tailed latch type circuit configuration including a plurality of transistors 301-314. The sampling circuit 300 can detect levels of the differential input terminals IN/INB at rising edges of clock terminal CLK. A clock signal ICK may be input to the clock terminal CLK, first input signals IN_A and INB_A may be input to the differential input terminals IN/INB, respectively, and a preliminary signal pair PREMD<0>/PREMDB<0> may be output through the differential output terminals OUT/OUTB, respectively.

The equalization circuit 400 may include a plurality of transistors 401-405. A clock signal ICK may be input to the clock terminal CLK, and equalization control terminals Dn−1/DBn−1 may input a previous data, i.e., a preliminary signal pair PREMD<2>/PREMDB<2> output from the third sampler 213, which receives a clock signal QCKB with a phase that precedes that of the received clock signal ICK, among the multi-phase clock signals ICK, QCK, ICKB AND QCKB.

The equalization circuit 400 may generate feedback signals FEED/FEEDB according to logic levels of the equalization control terminals Dn−1/DBn−1, that is, logic levels of the preliminary signal pair PREMD<2>/PREMDB<2> input to the equalization control terminals Dn−1/DBn−1. By applying feedback signals FEED/FEEDB to a first node ND1 and a second node ND2 of the sampling circuit 300 to change the reference voltage of the sampling circuit 300, an equalization operation according to the first equalization method can be performed. The voltage level of the first node ND1 and the voltage level of the second node ND2 may be used as a reference voltage for each other.

The size of the plurality of transistors 401-405 of the equalization circuit 400 will be referred to as a basic size (Size*1), and it will be assumed that the level of the reference voltage of the sampler 300 changes by one step relative to the first reference voltage VREF_H based on the default size (Size*1). As will be described later, for example, if the size of the transistor is doubled (Size*2), the level of the reference voltage of the sampler 300 may change by two steps with respect to the first reference voltage VREF_H, and if the size of the transistor is tripled (Size*3), the level of the reference voltage of the sampler 300 may change by three steps with respect to the first reference voltage VREF_H.

When a logic level of the equalization control terminal Dn−1 is "0", a logic level of the equalization control terminal DBn−1 may become "1" so that a voltage of the first node ND1 can be lowered relative to the second node ND2 as the transistor 404 is turned on. By lowering the voltage of the first node ND1 relative to the second node ND2, the reference voltage of the sampler 300 can be lowered by one step relative to the first reference voltage VREF_H. Hereinafter, the reference voltage that is one step lower than the first reference voltage VREF_H will be referred to as VREF_H−1.

When the logic level of the equalization control terminal Dn−1 is '1', the logic level of the equalization control terminal DBn−1 may become '0' so that the voltage of the second node ND2 can be lowered relative to the first node ND1 as the transistor 403 is turned on. By lowering the voltage of the second node ND2 relative to the first node ND1, the reference voltage of the sampler 300 can be increased by one step relative to the first reference voltage VREF_H. Hereinafter, the reference voltage that is one step higher than the first reference voltage VREF_H will be referred to as VREF_H+1.

On the other hand, the third sampling unit (DFL) 201B of FIG. 1 may be configured identically to the first sampling unit 201A described with reference to FIGS. 2 and 3. Therefore, a description thereof will be omitted. The third sampling unit 201B may also be capable of adjusting a reference voltage of the second sampling circuit 200B by controlling the logic level of the equalization control terminal Dn−1. Hereinafter, a reference voltage that is one step lower than the second reference voltage VREF_L will be referred to as VREF_L−1, and a reference voltage that is one step higher than the second reference voltage VREF_L will be referred to as VREF_L+1.

The first sampling unit 201A and the third sampling unit 201B of the first equalization method described above (the direct feedback method), when applied to PAM-3 communication, perform an equalization operation by receiving feedback of the previous data and raising or lowering the reference voltage by one step so that the feedback is the same as the sampling circuit according to the NRZ (Non Return to Zero) method, thereby minimizing parasitic capacitance of the feedback line and signal loading to reduce the feedback time.

Figure 4:
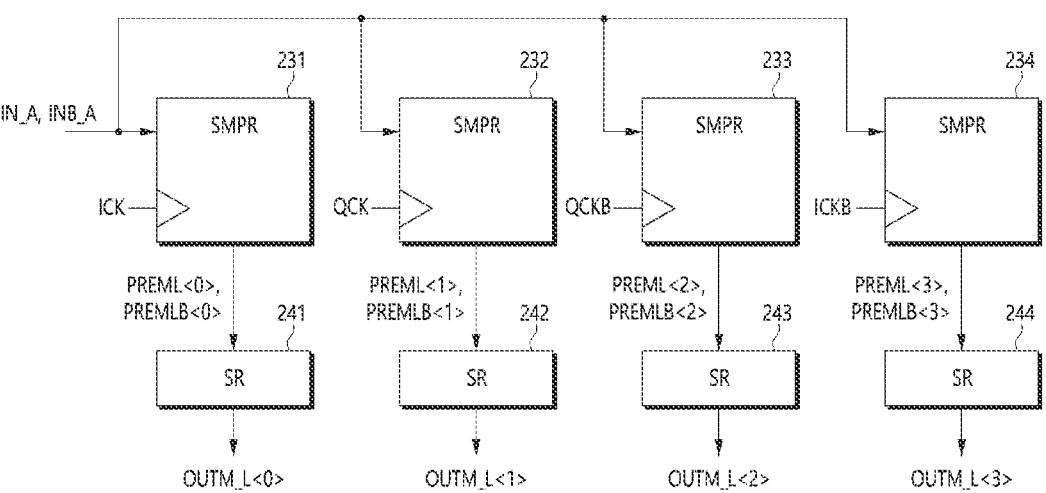
FIG. 4 is a diagram illustrating a configuration of a second sampling unit of FIG. 1 according to an embodiment.

FIG. 4 is a diagram illustrating a configuration of the second sampling unit 202A of FIG. 1 according to an embodiment.

Referring to FIG. 4, the second sampling unit 202A may include a plurality of samplers (SMPRs) 231-234 and a plurality of latches (SRs) 241-244.

The plurality of samplers 231-234 may have the same circuit configuration as each other. The plurality of samplers 231-234 may sample the first input signals IN_A and INB_A according to each of the multi-phase clock signals ICK, QCK, ICKB AND QCKB. The plurality of samplers 231-234 may output preliminary signals PREML<0:3>/PREMLB<0:3> according to the sampling results.

The plurality of latches 241-244 may have the same circuit configuration as each other. The plurality of latches 241-244 may latch the preliminary signals PREML<0:3>/PREMLB<0:3> and may output the latched signal as the second preliminary sampling signal OUTM_L<0:3>.

Figure 5:
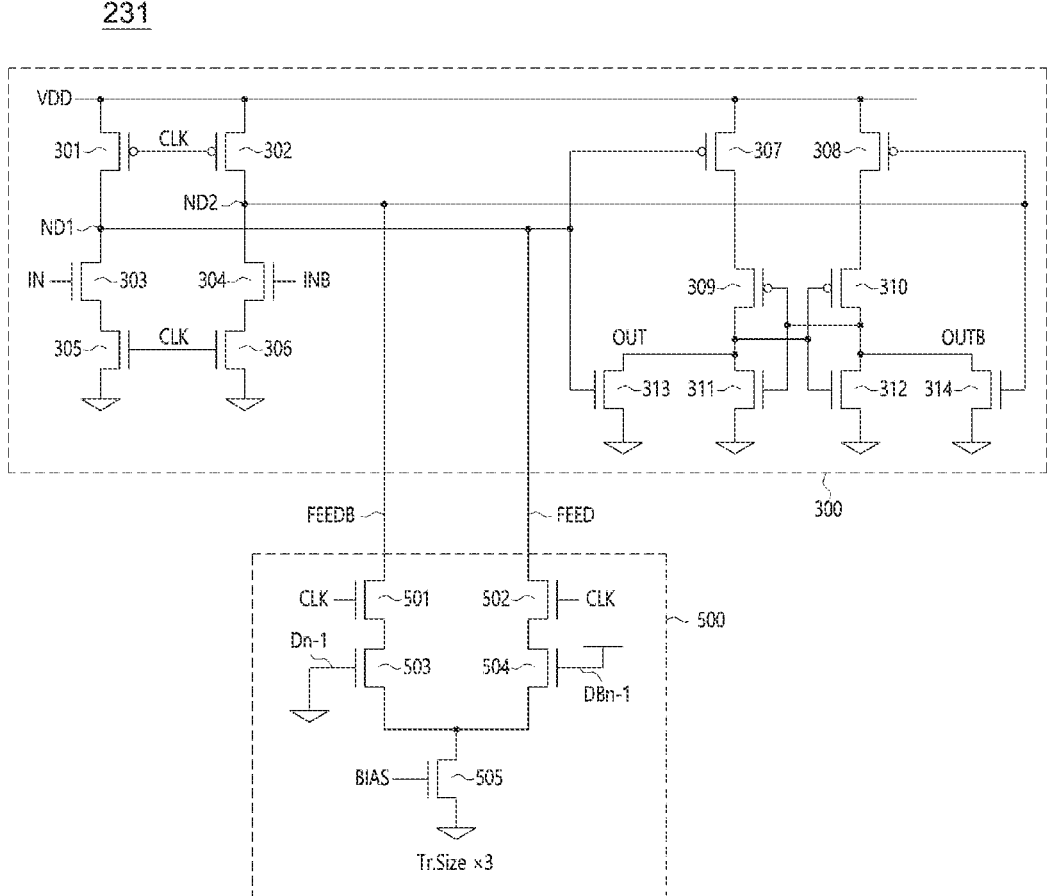
FIG. 5 is a diagram illustrating a configuration of a sampler of FIG. 4 according to an embodiment.

FIG. 5 is a diagram illustrating a configuration of the sampler 231 of FIG. 4 according to an embodiment.

Referring to FIG. 5, the sampler 231 may include a sampling circuit 300 and an equalization circuit 500.

The sampling circuit 300 may be configured in the same manner as the sampling circuit 300 of FIG. 3.

An equalization circuit 500 may include a plurality of transistors 501-505. A clock signal ICK may be input to the clock terminal CLK, and logic levels of the equalization control terminals Dn−1/DBn−1 may be fixed at a predetermined level independent of the previous data.

By connecting a ground voltage to the equalization control terminal Dn−1 so that the logic level of the equalization control terminal Dn−1 becomes "0" and by connecting a power voltage to the equalization control terminal DBn−1 so that the logic level of the equalization control terminal DBn−1 becomes "1," the voltage of the first node ND1 relative to the second node ND2 can be lowered as the transistor 504 is turned on. By designing the size (Size*3) of the plurality of transistors 501-505 of the equalization circuit 500 to be three times the size (Size*1) of the transistors of the equalization circuit 400 of FIG. 3, a level of the reference voltage of the sampler 300 can be lowered by three steps relative to the first reference voltage VREF_H. Hereinafter, the reference voltage that is three steps lower than the first reference voltage VREF_H will be referred to as VREF_H−3.

On the other hand, the fourth sampling unit (LUL) 202B of FIG. 1 may be configured identically to the second sampling unit 202A described with reference to FIGS. 4 and 5, except that the logic levels of the equalization control terminals Dn−1/DBn−1 are fixed differently from the logic levels of the equalization control terminals Dn−1/DBn−1 of the second sampling unit 202A. Therefore, the description thereof will be omitted.

The equalization circuit 500 of the fourth sampling unit 202B may connect the power voltage to the equalization control terminal Dn−1 so that the logic level of the equalization control terminal Dn−1 is "1" and may connect the ground voltage to the equalization control terminal DBn−1 so that a logic level of the equalization control terminal DBn−1 is "O" so that the voltage of the second node ND2 relative to the first node ND1 can be lowered as the transistor 503 is turned on. By designing the size (Size*3) of the plurality of transistors 501-505 of the equalization circuit 500 to be three times the size (Size*1) of the transistors of the equalization circuit 400 of FIG. 3, a level of the reference voltage of the sampler 300 can be increased by three steps relative to the first reference voltage VREF_H. Hereinafter, the reference voltage that is three steps higher than the second reference voltage VREF_L will be referred to as VREF_L+3.

The second sampling unit 202A and the fourth sampling unit 202B of the second equalization method described above (the loop unroll method) can reduce the circuit area and power consumption by performing an equalization operation according to fixed reference voltages VREF_H−3, VREF_L+3 when applied to PAM-3 communication.

Figure 6:
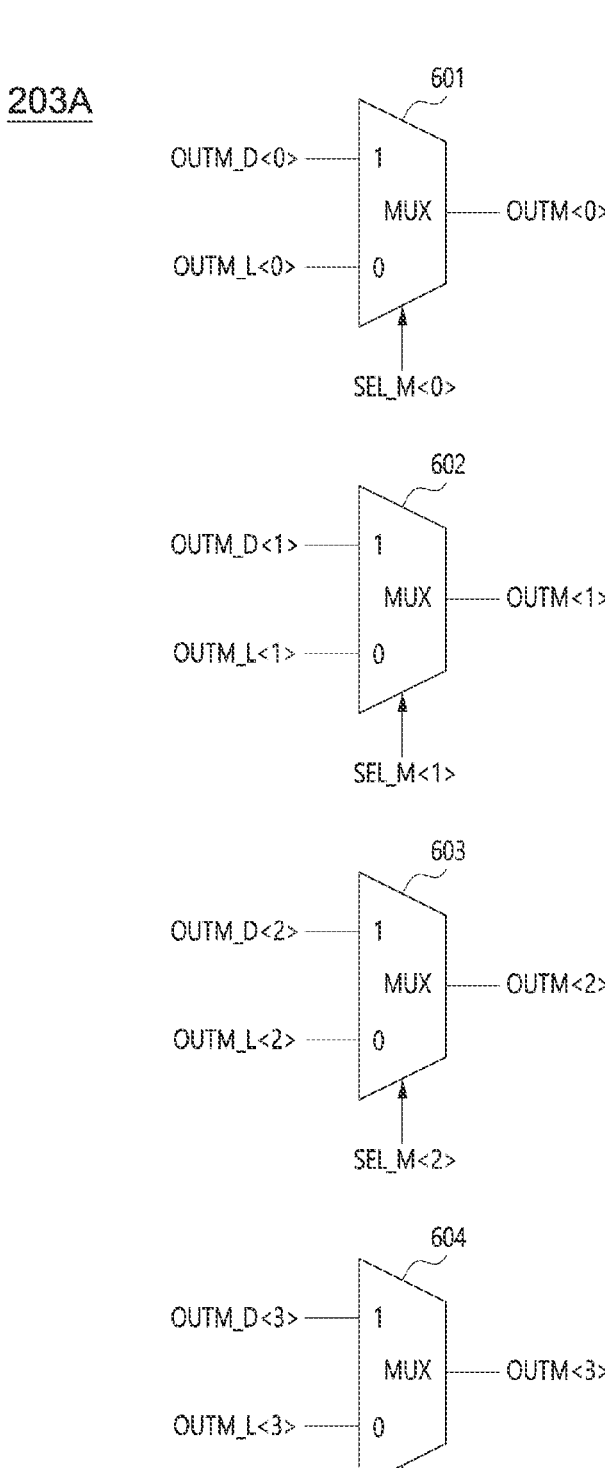
FIG. 6 is a diagram illustrating a configuration of a first multiplexing circuit of FIG. 1 according to an embodiment.

FIG. 6 is a diagram illustrating a configuration of the first multiplexing circuit 203A of FIG. 1 according to an embodiment. Referring to FIG. 6, the first multiplexing circuit 203A may include a plurality of multiplexers 601-604.

The first multiplexer 601 may select one of a first preliminary sampling signal OUTM_D<0> and a second preliminary sampling signal OUTM_L<0> according to a second selection signal SEL_M<0> to output as a first sampling signal OUTM<0>. The first multiplexer 601 may select and output the first preliminary sampling signal OUTM_D<0> as the first sampling signal OUTM<0> when the second selection signal SEL_M<0> is high level and may select and output the second preliminary sampling signal OUTM_L<0> as the first sampling signal OUTM<0> when the second selection signal SEL_M<0> is low level.

The second multiplexer 602 may select one of a first preliminary sampling signal OUTM_D<1> and a second preliminary sampling signal OUTM_L<1> according to a second selection signal SEL_M<1> to output as a first sampling signal OUTM<1>. The second multiplexer 602 may select and output the first preliminary sampling signal OUTM_D<1> as the first sampling signal OUTM<1> when the second selection signal SEL_M<1> is high level and may select and output the second preliminary sampling signal OUTM_L<1> as the first sampling signal OUTM<1> when the second selection signal SEL_M<1> is low level.

The third multiplexer 603 may select one of a first preliminary sampling signal OUTM_D<2> and a second preliminary sampling signal OUTM_L<2> according to a second selection signal SEL_M<2> to output as a first sampling signal OUTM<2>. The third multiplexer 603 may select and output the first preliminary sampling signal OUTM_D<2> as the first sampling signal OUTM<2> when the second selection signal SEL_M<2> is at a high level and may select and output the second preliminary sampling signal OUTM_L<2> as the first sampling signal OUTM<2> when the second selection signal SEL_M<2> is at a low level.

The fourth multiplexer 604 may select one of a first preliminary sampling signal OUTM_D<3> and a second preliminary sampling signal OUTM_L<3> according to a second selection signal SEL_M<3> to output as a first sampling signal OUTM<3>. The fourth multiplexer 604 may select and output the first preliminary sampling signal OUTM_D<3> as the first sampling signal OUTM<3> when the second selection signal SEL_M<3> is high level and may select and output the second preliminary sampling signal OUTM_L<3> as the first sampling signal OUTM<3> when the second selection signal SEL_M<3> is low level.

Figure 7:
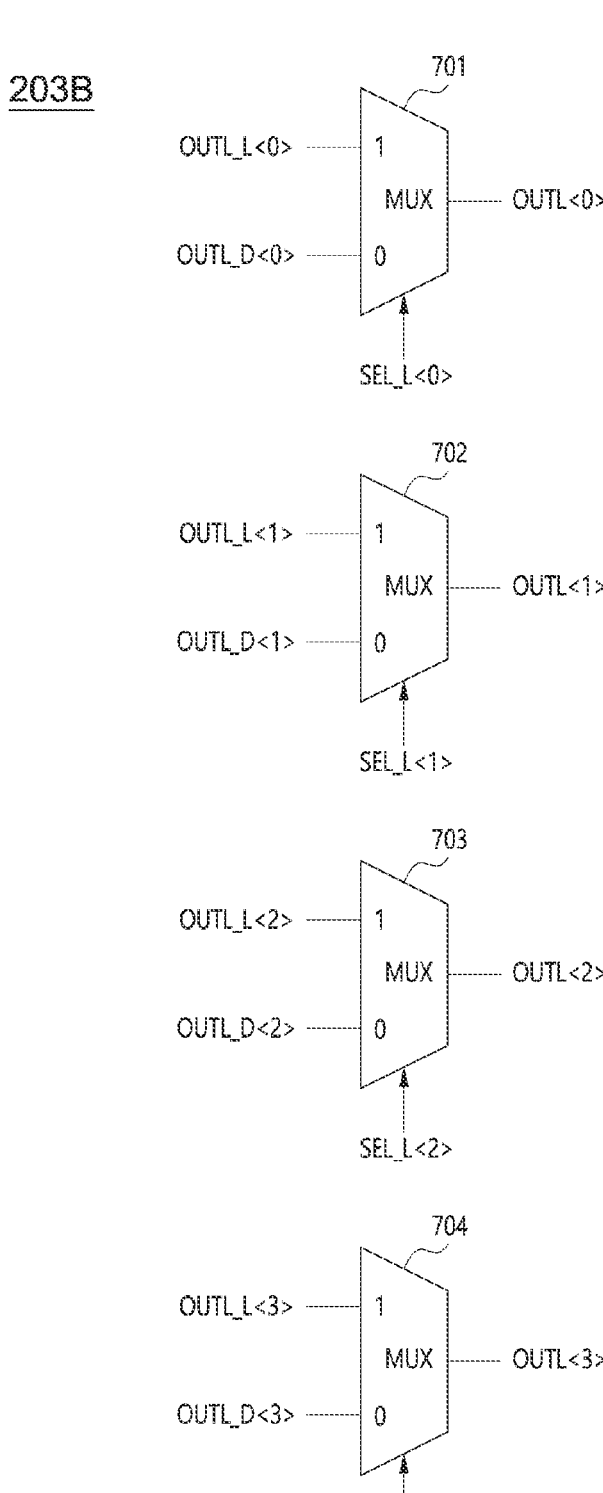
FIG. 7 is a diagram illustrating a configuration of a second multiplexing circuit of FIG. 1 according to an embodiment.

FIG. 7 is a diagram illustrating a configuration of the second multiplexing circuit 203B of FIG. 1 according to an embodiment. Referring to FIG. 7, the second multiplexing circuit 203B may include a plurality of multiplexers 701-704.

The first multiplexer 701 may select one of a third preliminary sampling signal OUTL_D<0> and a fourth preliminary sampling signal OUTL_L<0> according to a first selection signal SEL_L<0> to output as a second sampling signal OUTL<0>. The first multiplexer 701 may select and output the fourth preliminary sampling signal OUTL_L<0> as the second sampling signal OUTL<0> when the first selection signal SEL_L<0> is at a high level and may select and output the third preliminary sampling signal OUTL_D<0> as the second sampling signal OUTL<0> when the first selection signal SEL_L<0> is at a low level.

The second multiplexer 702 may select one of a third preliminary sampling signal OUTL_D<1> and a fourth preliminary sampling signal OUTL_L<1> according to a first selection signal SEL_L<1> to output as a second sampling signal OUTL<1>. The second multiplexer 702 may select and output the fourth preliminary sampling signal OUTL_L<1> as the second sampling signal OUTL<1> when the first selection signal SEL_L<1> is high level and may select and output the third preliminary sampling signal OUTL_D<1> as the second sampling signal OUTL<1> when the first selection signal SEL_L<1> is low level.

The third multiplexer 703 may select one of a third preliminary sampling signal OUTL_D<2> and a fourth preliminary sampling signal OUTL_L<2> according to a first selection signal SEL_L<2> to output as a second sampling signal OUTL<2>. The third multiplexer 703 may select and output the fourth preliminary sampling signal OUTL_L<2> as the second sampling signal OUTL<2> when the first selection signal SEL_L<2> is at a high level and may select and output the third preliminary sampling signal OUTL_D<2> as the second sampling signal OUTL<2> when the first selection signal SEL_L<2> is at a low level.

The fourth multiplexer 704 may select one of a third preliminary sampling signal OUTL_D<3> and a fourth preliminary sampling signal OUTL_L<3> according to a first selection signal SEL_L<3> to output as a second sampling signal OUTL<3>. The fourth multiplexer 704 may select and output the fourth preliminary sampling signal OUTL_L<3> as the second sampling signal OUTL<3> when the first selection signal SEL_L<3> is at a high level and may select and output the third preliminary sampling signal OUTL_D<3> as the second sampling signal OUTL<3> when the first selection signal SEL_L<3> is at a low level.

Hereinafter, the operation of the receiver circuit 100 according to an embodiment will be described with reference to FIGS. 8 to 9C.

Figure 9B:
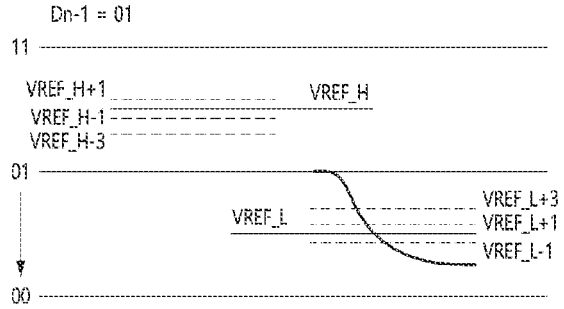
Figure 9B:
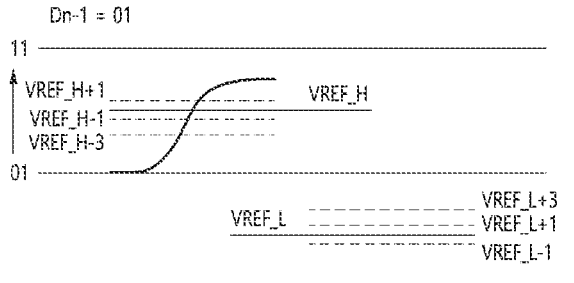
Figure 9C:
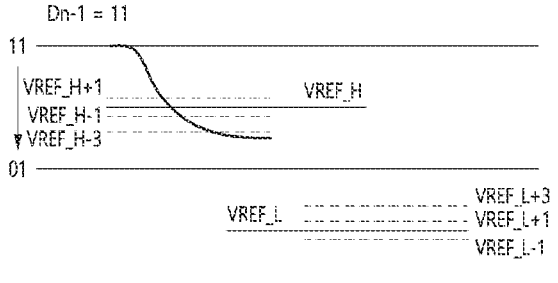
Figure 9C:
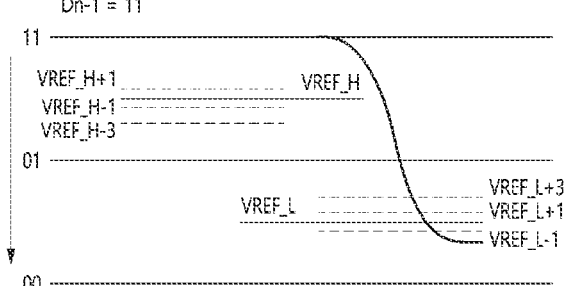

FIG. 8 is a diagram illustrating a selection of an equalization method and reference voltage variation of the sampling circuit 200 of FIG. 1 according to an embodiment, and FIG. 9A to FIG. 9C are diagrams illustrating equalization operation of the receiver circuit by logic level transition of a multi-level signal according to an embodiment.

Referring to FIG. 8, the reference voltage of each of the first sampling unit (DFH), the second sampling unit (LUH), the third sampling unit (DFL), and the fourth sampling unit (LUL) and the selected equalization method are summarized for each case of logic levels of the previous data Dn−1.

First, when the previous data Dn−1 is '00', the reference voltages of each of the first sampling unit (DFH), the second sampling unit (LUH), the third sampling unit (DFL), and the fourth sampling unit (LUL) may be set to VREF_H−1, VREF_H−3, VREF_L−1, and VREF_L+3. Based on the second selection signal SEL_M<i>, the output of the second sampling unit (LUH) according to the second equalization method may be output as the first sampling signal OUTM<i> corresponding to the most significant bit of current data. Furthermore, based on the first selection signal SEL_L<i>, the output of the third sampling unit (DFL) according to the first equalization method may be output as the second sampling signal OUTL<i> corresponding to the least significant bit of current data. As shown in FIG. 9A, when the previous data Dn−1 is '00', the currently input data may transition to a level of '01' or '11'.

Therefore, the level of the reference voltage of the first sampling unit (DFH) may be reduced to VREF_H−1, which is close to the level '00' of the previous data Dn−1, and the level of the reference voltage of the third sampling unit (DFL) may be reduced to VREF_L−1, which is close to the level '00' of the previous data Dn−1. Meanwhile, the reference voltages of the second sampling unit (LUH) and the fourth sampling unit (LUL) may be fixed at VREF_H−3 and VREF_L+3, respectively, regardless of the level of the previous data Dn−1, as mentioned above.

Also, when the previous data Dn−1 transitions from '00' to '01' or '11', the time until the most significant bit of the current sampled data is levelled may be relatively long compared to the least significant bit of the current sampled data. In this case, the second sampling signal OUTL<0:3> may correspond to the least significant bit of the sampled data, and the first sampling signal OUTM<0:3> may correspond to the most significant bit of the sampled data. Therefore, in the first sampling circuit 200A, the second sampling unit (LUH) according to the second equalization method, which is advantageous in terms of securing feedback time, may be selected, and in the second sampling circuit 200B, the third sampling unit (DFL) according to the first equalization method may be selected.

Next, when the previous data Dn−1 is '01', the reference voltages of each of the first sampling unit (DFH), the second sampling unit (LUH), the third sampling unit (DFL), and the fourth sampling unit (LUL) may be set to VREF_H−1, VREF_H−3, VREF_L+1, and VREF_L+3. Based on the second selection signal SEL_M<i>, the output of the first sampling unit (DFH) according to the first equalization method may be output as the first sampling signal OUTM<i> corresponding to the most significant bit of the current data. Furthermore, based on the first selection signal SEL_L<i>, the output of the third sampling unit (DFL) according to the first equalization method may be output as the second sampling signal OUTL<i> corresponding to the least significant bit of the current data.

As shown in FIG. 9B, when the previous data Dn−1 is '01', the currently input data may transition to a level of '00' or '11'.

Therefore, the level of the reference voltage of the first sampling unit (DFH) may be lowered to VREF_H−1, which is close to the level '01' of the previous data Dn−1, and the level of the reference voltage of the third sampling unit (DFL) may be raised to VREF_L+1, which is close to the level '01' of the previous data Dn−1. Meanwhile, the reference voltages of the second sampling unit (LUH) and the fourth sampling unit (LUL) may be fixed at VREF_H−3 and VREF_L+3, respectively, regardless of the level of the previous data Dn−1, as mentioned above.

Also, when the previous data Dn−1 transitions from '01' to '00' or '11', the times until the level of the sampled current data and the least significant bit of the sampled current data are determined may be the same. In this case, the second sampling signal OUTL<0:3> may correspond to the least significant bit of the sampled data, and the first sampling signal OUTM<0:3> may correspond to the most significant bit of the sampled data. Therefore, in the first sampling circuit 200A, a first sampling unit (DFH) according to the first equalization method may be selected, and in the second sampling circuit 200B, a third sampling unit (DFL) according to the first equalization method may be selected.

Next, when the previous data Dn−1 is '11', the reference voltages of each of the first sampling unit (DFH), the second sampling unit (LUH), the third sampling unit (DFL), and the fourth sampling unit (LUL) may be set to VREF_H+1, VREF_H−3, VREF_L+1, and VREF_L+3. Based on the second selection signal SEL_M<i>, the output of the first sampling unit (DFH) according to the first equalization method may be output as the first sampling signal OUTM<i> corresponding to the most significant bit of the current data. Furthermore, based on the first selection signal SEL_L<i>, the output of the fourth sampling unit (LUL) according to the second equalization method may be output as the second sampling signal OUTL<i> corresponding to the least significant bit of the current data.

As shown in FIG. 9C, when the previous data Dn−1 is '11', the currently input data may transition to a level of '01' or '00'.

Therefore, the level of the reference voltage of the first sampling unit (DFH) may be increased to VREF_H+1, which is close to the level '11' of the previous data Dn−1, and the level of the reference voltage of the third sampling unit (DFL) may be increased to VREF_L+1, which is close to the level '11' of the previous data Dn−1. Meanwhile, the reference voltages of the second sampling unit (LUH) and the fourth sampling unit (LUL) may be fixed at VREF_H−3 and VREF_L+3, respectively, regardless of the level of the previous data Dn−1, as mentioned above.

A person skilled in the art to which the present disclosure pertains can understand that the present disclosure may be carried out in other specific forms without changing its technical spirit or essential features. Therefore, it should be understood that the embodiments described above are illustrative in all aspects, not limitative. The scope of the present disclosure is defined by the claims to be described below rather than the detailed description, and it should be construed that the meaning and scope of the claims and all changes or modified forms derived from the equivalent concept thereof are included in the scope of the present disclosure.

What is claimed is:

1. A receiver circuit comprising:
a first buffer configured to receive a multi-level signal according to a first reference voltage to generate a first input signal;
a second buffer configured to receive the multi-level signal according to a second reference voltage to generate a second input signal; and
a sampling circuit configured to sample each of the first input signal and the second input signal according to a first equalization method and a second equalization method, respectively, and configured to output one of a first sampling result value according to the first equalization method and a second sampling result value according to the second equalization method according to a logic value of a previously input multi-level signal.

2. The receiver circuit of claim 1, wherein the first equalization method is a Direct Feedback method, and
wherein the second equalization method is a Loop Unrolled method.

3. The receiver circuit of claim 1, wherein, when the logic value of the previously input multi-level signal is '00', the sampling circuit is configured to sample the first input signal according to the second equalization method and configured to sample the second input signal according to the first equalization method.

4. The receiver circuit of claim 3, wherein the sampling circuit is configured to fix levels of reference voltages to be used as a reference during an equalization operation according to the second equalization method and configured to change the levels of the reference voltages to be used as a reference to be one step lower than the second reference voltage during the equalization operation according to the first equalization method.

5. The receiver circuit of claim 1, wherein, when the logic value of the previously input multi-level signal is '01', the sampling circuit is configured to sample the first input signal according to the first equalization method and configured to sample the second input signal according to the first equalization method.

6. The receiver circuit of claim 5, wherein the sampling circuit is configured to fix levels of reference voltages to be used as a reference during an equalization operation according to the second equalization method and configured to change the levels of the reference voltages to be used as a reference to be one step lower than the first reference voltage during the equalization operation according to the first equalization method.

7. The receiver circuit of claim 1, wherein, when the logic value of the previously input multi-level signal is '11', the sampling circuit is configured to sample the first input signal according to the first equalization method and configured to sample the second input signal according to the second equalization method.

8. The receiver circuit of claim 7, wherein the sampling circuit is configured to fix levels of reference voltages to be used as a reference during an equalization operation according to the second equalization method, and configured to change the levels of the reference voltages to be used as a reference to be one step higher than the first reference voltage during the equalization operation according to the first equalization method.

9. The receiver circuit of claim 1, the multi-level signal is transmitted according to a Pulse Amplitude Modulation (PAM)-3 method.

10. A receiver circuit comprising:
a first buffer configured to receive a multi-level signal according to a first reference voltage to generate a first input signal;
a second buffer configured to receive the multi-level signal according to a second reference voltage to generate a second input signal;
a first sampling circuit configured to:
sample the first input signal using a first equalization method to generate a first preliminary sampling signal;

sample the first input signal using a second equalization method to generate a second preliminary sampling signal;

generate a first selection signal based on one of the first preliminary sampling signal and the second preliminary sampling signal; and select and output one of the first preliminary sampling signal and the second preliminary sampling signal as a first sampling signal based on a second selection signal; and a second sampling circuit configured to:

sample the second input signal using the first equalization method to generate a third preliminary sampling signal;

sample the second input signal using the second equalization method to generate a fourth preliminary sampling signal;

generate the second selection signal based on one of the third preliminary sampling signal and the fourth preliminary sampling signal; and select and output one of the third preliminary sampling signal and the fourth preliminary sampling signal as a second sampling signal based on the first selection signal.

11. The receiver circuit of claim 10, wherein the first sampling circuit comprises:

a first sampling unit configured to sample the first input signal using the first equalization method to generate the first preliminary sampling signal;

a second sampling unit configured to sample the first input signal using the second equalization method to generate the second preliminary sampling signal; and a multiplexing circuit configured to select and output one of the first preliminary sampling signal and the second preliminary sampling signal according to the second selection signal as the first sampling signal.

12. The receiver circuit of claim 10, wherein the first sampling circuit comprises:

a first sampling unit configured to generate the first preliminary sampling signal by sampling the first input signal and performing equalization according to the first equalization method according to multi-phase clock signals;

a second sampling unit configured to generate the second preliminary sampling signal by sampling the first input signal and performing equalization according to the second equalization method according to the multi-phase clock signals; and a multiplexing circuit configured to select and output one of the first preliminary sampling signal and the second preliminary sampling signal according to the second selection signal as the first sampling signal.

13. The receiver circuit of claim 12, wherein the first sampling unit comprises a plurality of samplers configured to sample the first input signal according to each of the multi-phase clock signals, and wherein each of the plurality of samplers is configured to receive a clock signal and perform the equalization according to an output of another sampler that receives a clock signal with a phase that precedes that of the received clock signal, among the multi-phase clock signals.

14. The receiver circuit of claim 12, wherein the second sampling unit comprises a plurality of samplers configured to sample the first input signal according to each of the multi-phase clock signals.

15. The receiver circuit of claim 10, wherein the second sampling circuit comprises:

a first sampling unit configured to sample the second input signal using the first equalization method to generate the third preliminary sampling signal;

a second sampling unit configured to sample the second input signal using the second equalization method to generate the fourth preliminary sampling signal; and a multiplexing circuit configured to select and output one of the third preliminary sampling signal and the fourth preliminary sampling signal according to the first selection signal as the second sampling signal.

16. The receiver circuit of claim 10, wherein the second sampling circuit comprises:

a first sampling unit configured to generate the third preliminary sampling signal by sampling the second input signal and performing equalization according to the first equalization method according to multi-phase clock signals;

a second sampling unit configured to generate the fourth preliminary sampling signal by sampling the second input signal and performing equalization according to the second equalization method according to the multi-phase clock signals; and a multiplexing circuit configured to select and output one of the third preliminary sampling signal and the fourth preliminary sampling signal according to the first selection signal as the second sampling signal.

17. The receiver circuit of claim 16, wherein the first sampling unit comprises a plurality of samplers configured to sample the second input signal according to each of the multi-phase clock signals, and wherein each of the plurality of samplers is configured to receive a clock signal and perform the equalization according to an output of another sampler that receives a clock signal with a phase that precedes that of the received clock signal, among the multi-phase clock signals.

18. The receiver circuit of claim 16, wherein the second sampling unit comprises a plurality of samplers configured to sample the second input signal according to each of the multi-phase clock signals.

19. The receiver circuit of claim 10, wherein the first equalization method is a Direct Feedback method, and wherein the second equalization method is a Loop Unrolled method.

20. The receiver circuit of claim 10, wherein, when a logic value of previously input multi-level signal is '00', the first sampling circuit is configured to sample the first input signal according to the second equalization method and output it as the first sampling signal, and the second sampling circuit is configured to sample the second input signal according to the first equalization method and output it as the second sampling signal.

21. The receiver circuit of claim 20, wherein the first sampling circuit is configured to fix levels of reference voltages to be used as a reference during an equalization operation according to the second equalization method and configured to change the levels of the reference voltages to be used as a reference to be one step lower than the first reference voltage during the equalization operation according to the first equalization method.

22. The receiver circuit of claim 20, wherein the second sampling circuit is configured to fix levels of reference voltages to be used as a reference during an equalization operation according to the second equalization method and configured to change the levels of the reference voltages to be used as a reference to be one step lower than the second reference voltage during the equalization operation according to the first equalization method.

23. The receiver circuit of claim 10, wherein, when a logic value of previously input multi-level signal is '01', the first sampling circuit is configured to sample the first input signal according to the first equalization method and output it as the first sampling signal, and the second sampling circuit is configured to sample the second input signal according to the first equalization method and output it as the second sampling signal.

24. The receiver circuit of claim 23, wherein the first sampling circuit is configured to fix levels of reference voltages to be used as a reference during an equalization operation according to the second equalization method and configured to change the levels of the reference voltages to be used as a reference one step to be lower than the first reference voltage during the equalization operation according to the first equalization method.

25. The receiver circuit of claim 23, wherein the second sampling circuit is configured to fix levels of reference voltages to be used as a reference during an equalization operation according to the second equalization method and configured to change the levels of the reference voltages to be used as a reference to be one step higher than the second reference voltage during the equalization operation according to the first equalization method.

26. The receiver circuit of claim 10, wherein, when a logic value of previously input multi-level signal is '11', the first sampling circuit is configured to sample the first input signal according to the first equalization method and output it as the first sampling signal, and the second sampling circuit is configured to sample the second input signal according to the second equalization method and output it as the second sampling signal.

27. The receiver circuit of claim 26, wherein the first sampling circuit is configured to fix levels of reference voltages to be used as a reference during an equalization operation according to the second equalization method and configured to change the levels of the reference voltages to be used as a reference to be one step higher than the first reference voltage during the equalization operation according to the first equalization method.

28. The receiver circuit of claim 26, wherein the second sampling circuit is configured to fix levels of reference voltages to be used as a reference during an equalization operation according to the second equalization method and configured to change the levels of the reference voltages to be used as a reference to be one step higher than the second reference voltage during the equalization operation according to the first equalization method.

29. The receiver circuit of claim 10, the multi-level signal is transmitted according to a Pulse Amplitude Modulation (PAM)-3 method.

* * * * *